United States Patent [19]

Clements

[11] Patent Number: 5,576,621

[45] Date of Patent: Nov. 19, 1996

[54] HINGED METAL DETECTION COVER FOR A RECEPTACLE

[75] Inventor: Philip E. Clements, Littleton, Colo.

[73] Assignee: Denver Dynamics, Inc., Englewood, Colo.

[21] Appl. No.: 209,394

[22] Filed: Mar. 10, 1994

[51] Int. Cl.$^6$ .......................... G01R 33/12; G01N 27/72; G08B 21/00; B07C 5/344

[52] U.S. Cl. .................. 324/239; 209/549; 209/567; 324/226; 324/262; 340/568

[58] Field of Search ............................ 324/204, 226, 324/233–243, 262, 326–329; 340/551, 568, 572; 209/549, 562, 567, 570, 571, 926; 361/179, 180

[56] References Cited

U.S. PATENT DOCUMENTS

| | | |
|---|---|---|
| 2,369,659 | 2/1945 | Carr . |
| 2,680,226 | 6/1954 | Whitehead et al. ............... 324/326 |
| 3,065,412 | 11/1962 | Rosenthal ............... 324/239 |
| 3,165,591 | 1/1965 | McClanahan ............... 324/239 X |
| 3,397,364 | 8/1968 | Crandall . |
| 4,024,468 | 5/1977 | Hirschi . |
| 4,030,026 | 6/1977 | Payne . |
| 4,110,679 | 8/1978 | Payne . |
| 4,128,803 | 12/1978 | Payne . |
| 4,325,027 | 4/1982 | Dykstra et al. ............... 324/329 |
| 4,367,138 | 1/1983 | Kustas . |
| 4,468,710 | 12/1984 | Schmidt . |
| 4,486,713 | 12/1984 | Gifford ............... 324/329 |
| 4,494,657 | 1/1985 | Oldenkamp ............... 209/636 |
| 4,563,644 | 1/1986 | Lenander et al. ............... 324/239 X |
| 4,632,253 | 12/1986 | Stromgren et al. ............... 209/571 X |
| 4,742,339 | 5/1988 | Baziuk ............... 340/568 |
| 4,782,970 | 11/1988 | Edwards ............... 209/926 X |
| 4,821,023 | 4/1989 | Parks ............... 340/551 |
| 5,001,425 | 3/1991 | Beling et al. ............... 324/239 |

FOREIGN PATENT DOCUMENTS

WO92/09508  6/1992  WIPO .

OTHER PUBLICATIONS

Gordon Products, Inc. Bulletin SW–4, Standard Sensitivity Loop Sensors Model PE606 Oct., 1992.

*Primary Examiner*—Gerard R. Strecker
*Attorney, Agent, or Firm*—John L. Isaac

[57] ABSTRACT

A metal detector especially adapted to prevent the inadvertent or unauthorized deposit of metal objects into receptacles includes a housing provided with a central opening surrounded by a funnel-like surface for directing articles into a receptacle such as a medical waste disposal bag, a trash can, or a laundry hamper. For use in the medical field to prevent the inadvertent disposal of surgical instruments, the metal detector housing may be pivotally connected by a hinge mechanism to a medical waste bag disposal bag holding cart to allow convenient removal and replacement of disposal bags. Battery powered detection circuitry includes a detector coil surrounding the central opening and operative to trigger visual and audible alarms for signalling the passage of a metal article through the housing opening if the output voltage in the detector circuit exceeds a predetermined threshold value. The detection circuitry includes an auto calibration feature which compares the output voltage of the detection coil with a reference voltage and integrates the results of the comparison over time to stabilize the sensitivity of the metal detector, while ignoring transient voltage fluctuations. A bar graph signal strength display in conjunction with a peak hold circuit allows an operator to evaluate the size of a metal article triggering an alarm.

14 Claims, 6 Drawing Sheets

HINGED METAL DETECTION COVER FOR A RECEPTACLE

BACKGROUND OF THE INVENTION

The present invention relates to metal detectors, and more particularly pertains to an improved metal detector especially adapted to prevent the inadvertent or unauthorized deposit of metal objects into receptacles. The device of the invention finds particular applications in preventing the inadvertent disposal of surgical instruments into medical waste disposal receptacles in medical facilities and cutlery in restaurant trash cans, as well as preventing the smuggling of metal objects in trash cans and laundry hampers in jails and prisons.

One of the major problems in the health care industry today is the high cost of patient care. One of the contributing factors is the difficulty controlling waste in the hospital environment. In the operating room, surgical instruments are routinely discarded along with the disposable drapes and gowns after an operation. These expensive instruments are intended for reuse, and their disposal represents a substantial waste. A recent survey of randomly selected hospitals revealed that such wasteful disposal of surgical instruments amounted to losses between $30,000.00 to $50,000.00 per operating room.

By law, used disposable surgical drapes and gowns are deposited in a so-called "red bag" designed for infectious waste. Such red bags are approximately the size of a lawn and garden trash and leaf bag. The red bags are held for use in an open position in each operating room by a bag holder, typically in the form of a wheeled cart. Hospital personnel merely wad up used drapes and gowns and stuff them into the red bag for disposal. As can be readily appreciated, valuable surgical instruments, typically fashioned from an expensive grade of stainless steel, can easily become bundled with the used drapes and gowns, and disposed, inadvertently or otherwise. Accordingly, it is an object of the present invention to provide a device to detect the disposal of such surgical instruments to allow for their retrieval and reuse.

In penal institutions such as jails and prisons, prisoners are encouraged to participate in various jobs and vocational training programs including welding, mechanics, and machining. Some inmates thus have access to machine tools and stock materials from which they might fashion weapons. Receptacles for trash and laundry, although necessary in the daily operations of such penal institutions, create the potential for the smuggling by inmates of weapons and potential weapon stock material from shop and training areas to other locations. Accordingly, the monitoring and search of such receptacles places a substantial burden on guards, and thus increases the operating costs. It is thus an object of the invention to provide a device to assist in the monitoring of such receptacles to prevent the unauthorized deposit of metal articles.

SUMMARY OF THE INVENTION

In order to achieve these and other objects of the invention, the present invention provides an improved metal detector especially adapted for preventing the inadvertent or unauthorized deposit of metal objects into receptacles which includes a housing provided with a central opening surrounded by a funnel-like surface for directing articles into a receptacle such as a medical waste disposal bag, a trash can, or a laundry hamper. For use in the medical field to prevent the inadvertent disposal of surgical instruments, the metal detector housing may be pivotally connected by a hinge mechanism to a medical waste disposal bag holding cart to allow convenient removal and replacement of disposal bags. Battery powered detection circuitry includes a detector coil surrounding the central opening and operative to trigger visual and audible alarms for signalling the passage of a metal article through the housing opening if the output voltage in the detector circuit exceeds a predetermined threshold value. The detection circuitry includes an auto calibration feature which compares the output voltage of the detection coil with a reference voltage and integrates the results of the comparison over time to stabilize the sensitivity of the metal detector, while ignoring transient voltage fluctuations. A bar graph signal strength display in conjunction with a peak hold circuit allows an operator to evaluate the size of a metal article triggering an alarm.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
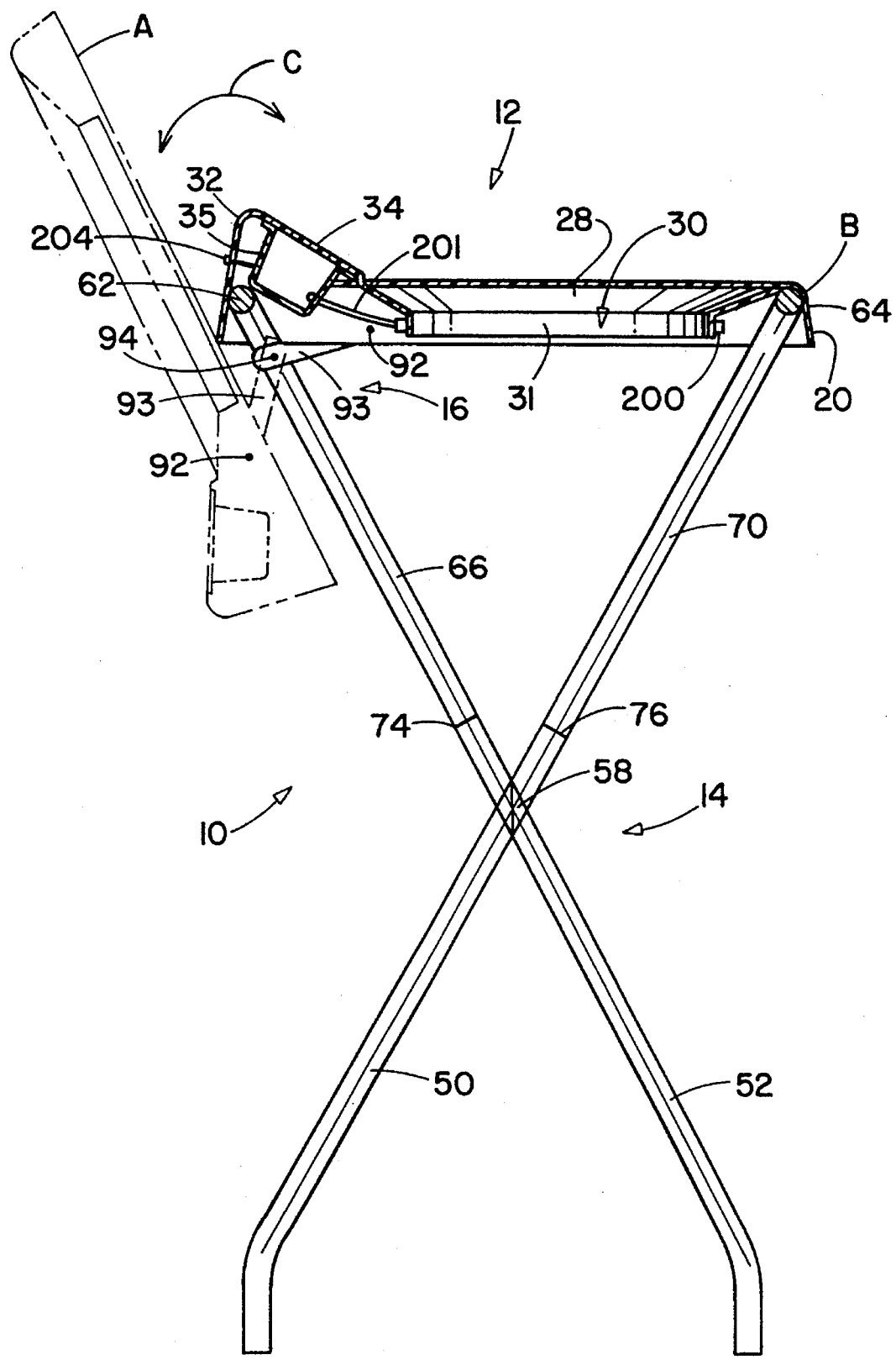
FIG. 1 is a side elevational view of the metal detector according to the first embodiment of the present invention pivotally mounting on a medical waste bag holding cart.
Figure 2:
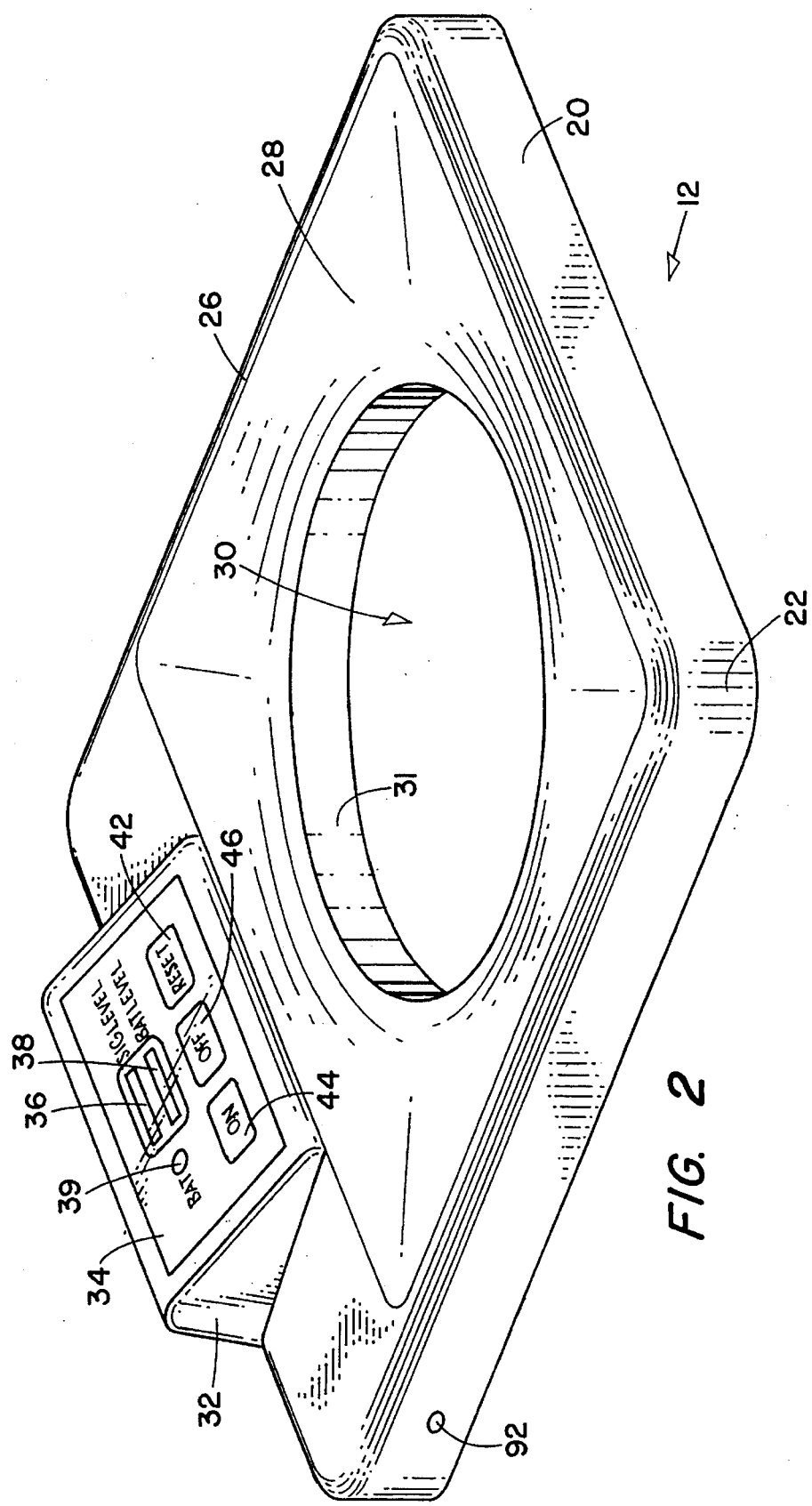
FIG. 2 is a top front perspective view illustrating the metal detector according to the present invention.

Referring now to the drawings, wherein like reference numerals designate corresponding structure throughout the views, and referring in particular to FIG. 1 and 2, an improved metal detector 10 according to a first preferred embodiment of the invention includes a housing portion 12 adapted for releasable securement in at least partially overlying relation to a receptacle such as a trash can, laundry hamper, or in the illustrated preferred embodiment, to a medical waste disposal bag holding cart 14. In use, a medical waste disposal bag (not shown) is held within the confines of the tubular cart 14, with the mouth of the bag in an open condition. A hinge 16, described in greater detail hereinafter, mounts the housing 12 to the cart 14 for pivotal movement generally along an arc C between an open position A and a closed position B. In the open position A, an attendant may easily remove and replace a medical waste disposal bag and also gain access to the contents. In the closed position B, the housing 12 covers the top of the cart 14 as well as the mouth of the disposal bag.

As shown in FIG. 2, the housing 12 has a generally rectangular shape, with a downwardly depending peripheral skirt 20 provided with smoothly radiused corners 22 to minimize the potential for injury as well as facilitate cleaning. The housing 12 is preferably formed as an integral component by a rotational molding process. In this conventional molding process, a powdered plastic resin material gradually melts within a heated, rotating mold. The liquified resin then "paints" the interior surfaces of the mold to form the part surfaces. After cooling, the part is then removed from the mold. In the instant case, the mold is preferably configured to produce two parts at once, which are severed after removal from the mold. A preferred plastic resin material is polypropylene, although a wide variety of other materials may also be employed.

The housing 12 includes a substantially planar upper surface 26. A funnel-shaped region 28 inclines downwardly and inwardly from the upper surface 26 to a central circular aperture 30 bounded by a downwardly extending short cylindrical flange 31. In use, the aperture 30 overlies and communicates with a top opening of a receptacle, such as a medical waste disposal bag. Accordingly, the funnel-shaped region 26 and the aperture 30 facilitate the deposit of articles into the underlying receptacle.

An inclined control console 32 extends upwardly from a top rear portion of the housing 12 and includes a forwardly and downwardly inclined control panel 34. As shown in FIG. 1, a hollow interior control box portion 35 of the console 32 forms a housing for electronic components of the metal detector 10. The control panel 34 includes a peak-hold type LCD bar graph 36 for displaying voltage levels induced in detection circuitry by deposit of metal articles through the aperture 30 in order to allow an operator to estimate the size of the metal article disposed. Thus, an insignificant metal object such as a surgical staple would provide a low signal level, while a large and expensive surgical instrument would provide a high signal level. The peak-hold feature causes the graph 36 to maintain the display for a time sufficient to enable operator inspection. A similar LCD bar graph 38 provides an indication of battery voltage to allow an operator to estimate remaining battery life. An LED low battery indicator 39 provides a positive indication of the need to recharge the system batteries. The metal detector 10 is designed for ease of operation, with minimal training. Toward this end, user operable controls comprise three buttons: "RESET" button 42 to silence an audible alarm after detection of a metal article and reset the metal detector for continued use, "ON" button 44, and "OFF" button 46. The control panel 34 is of the flexible membrane type commonly employed on microwave ovens in which the control buttons comprise zones designated by indicia which do not protrude above the panel. The LCD bar graph displays 36 and 38 and the LED 39 underlie the panel 34 and are displayed through transparent windows. Panels of this type are custom fabricated pursuant to customer specifications by a number of vendors. One manufacturer of such panels is Graphic Plastics, Inc. of Albuquerque, N.M.

Figure 3:
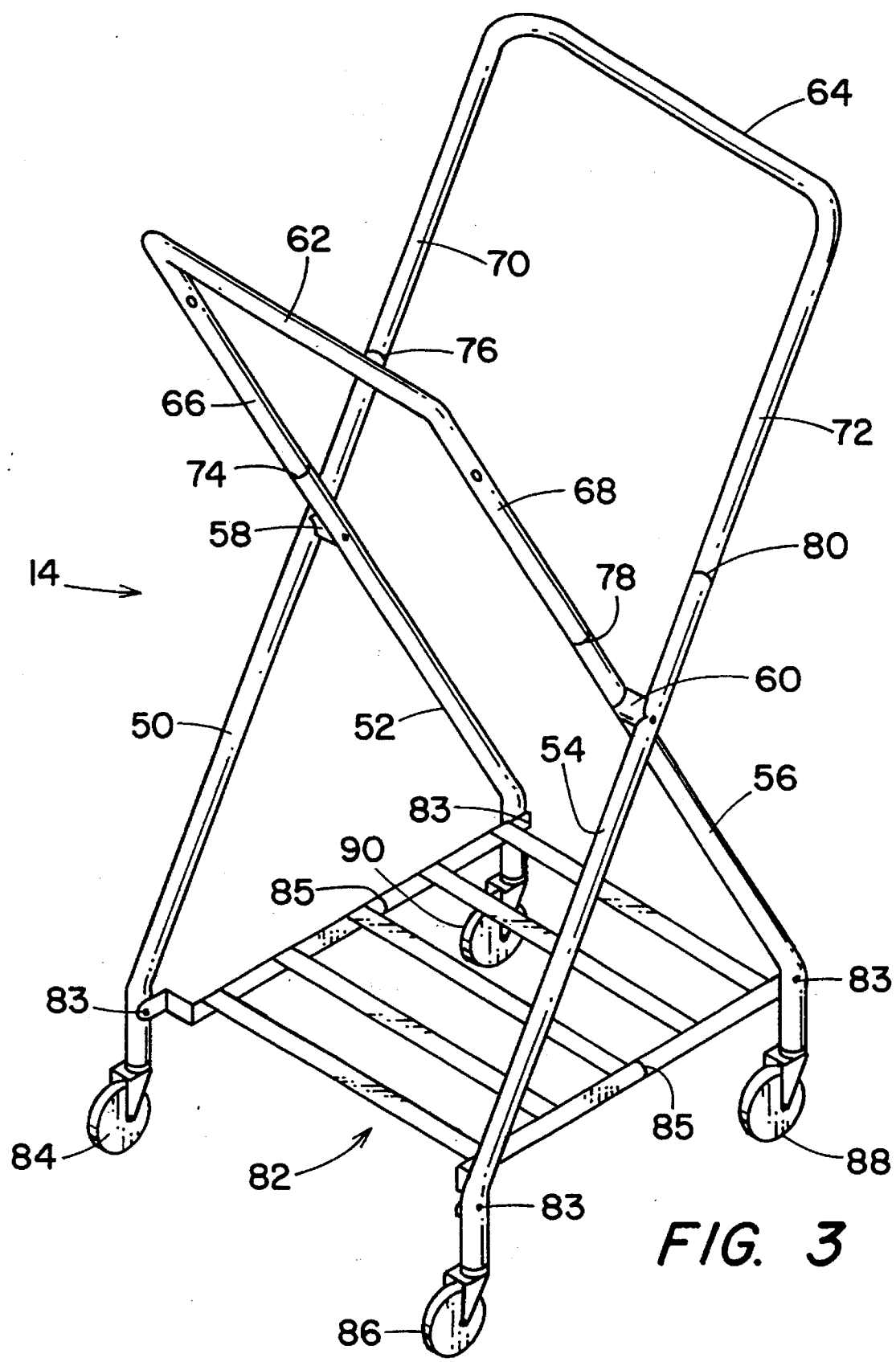
FIG. 3 is a top front view perspective view illustrating a medical waste bag holding cart for use with the metal detector of the present invention.
Figure 4:
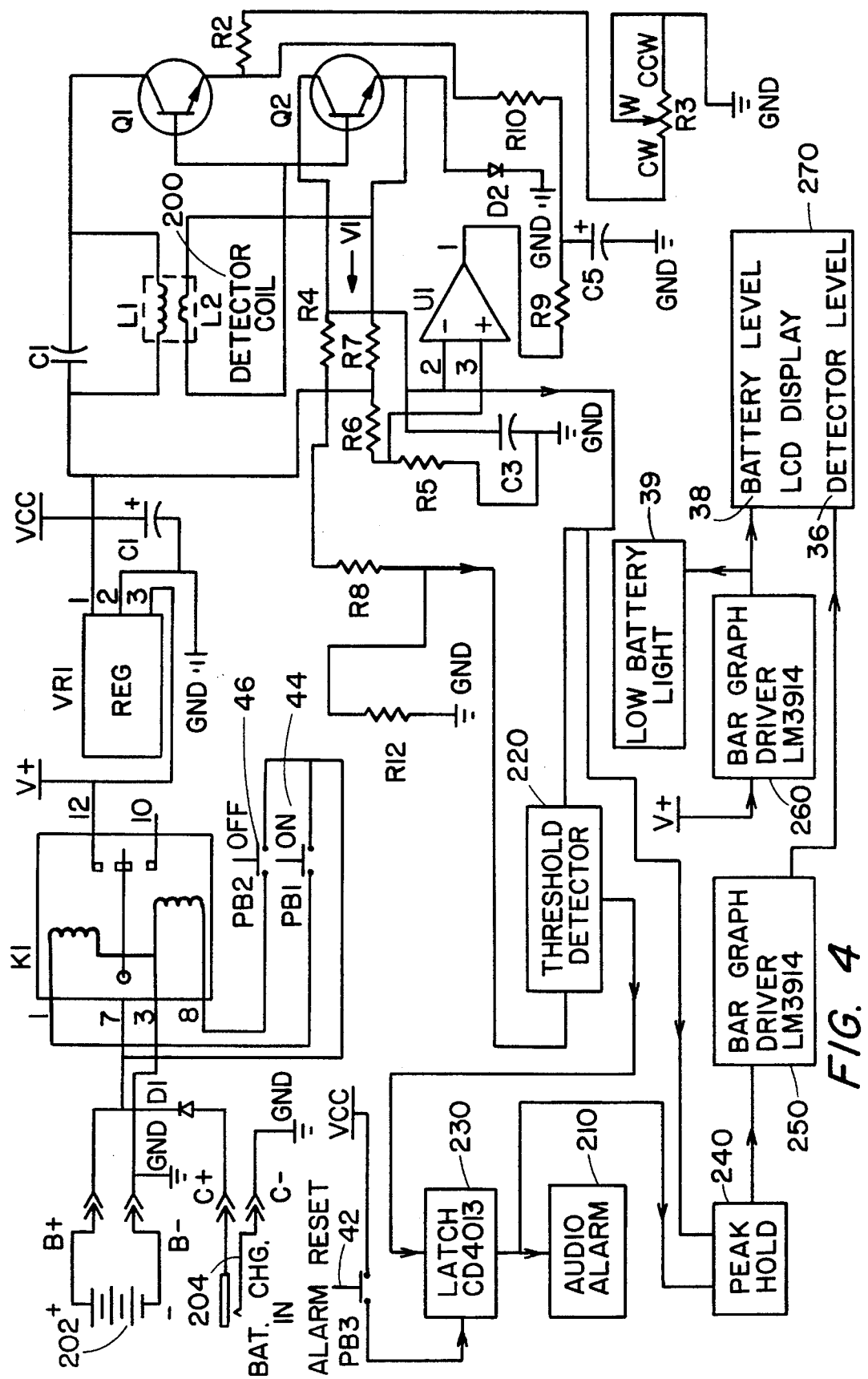
FIG. 4 is a schematic diagram illustrating the circuitry of the metal detector of the present invention.
Figure 5:
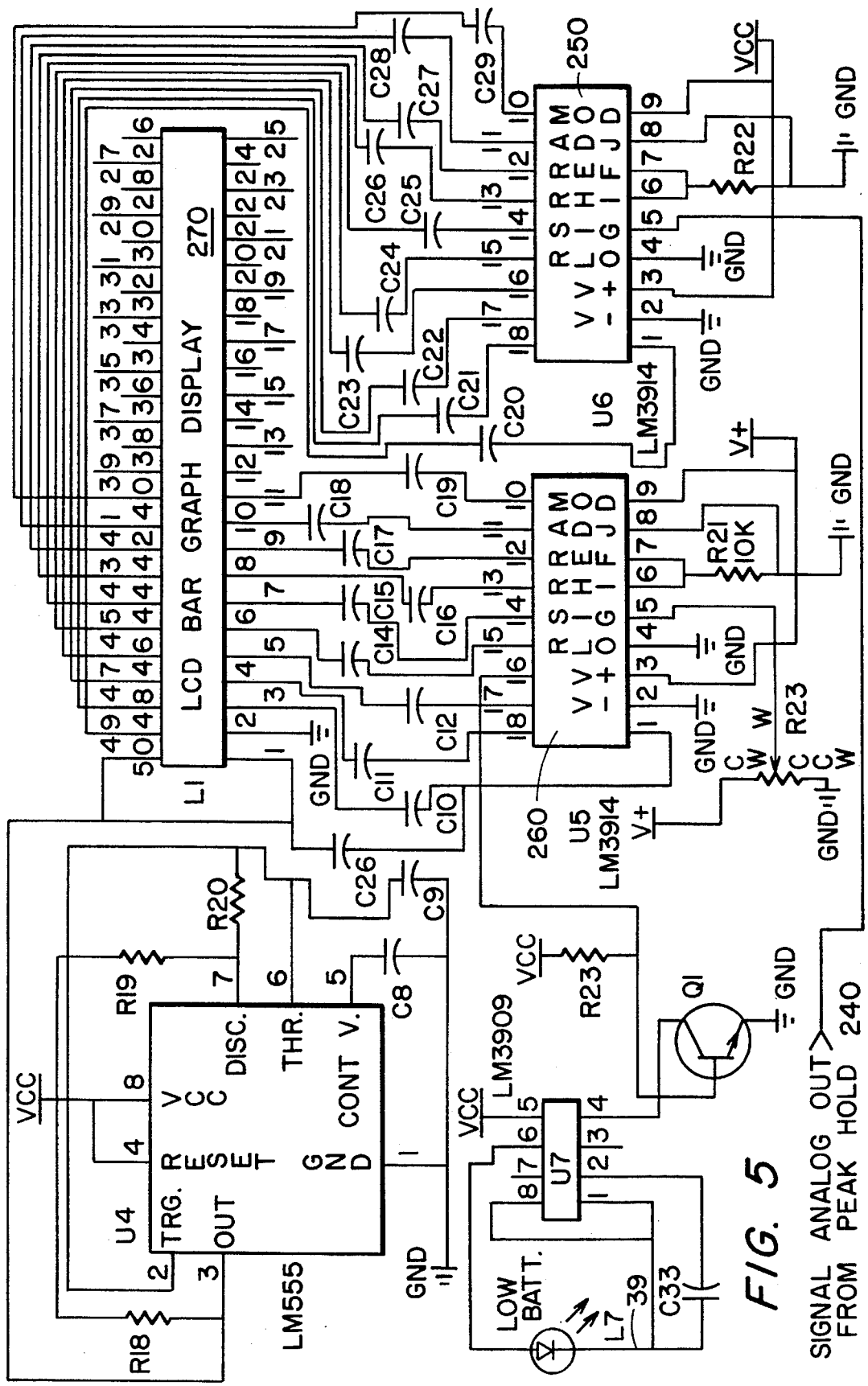
FIG. 5 is a schematic diagram illustrating the bar graph display and associated driver circuitry for displaying detector signal strength and battery voltage.
Figure 7:
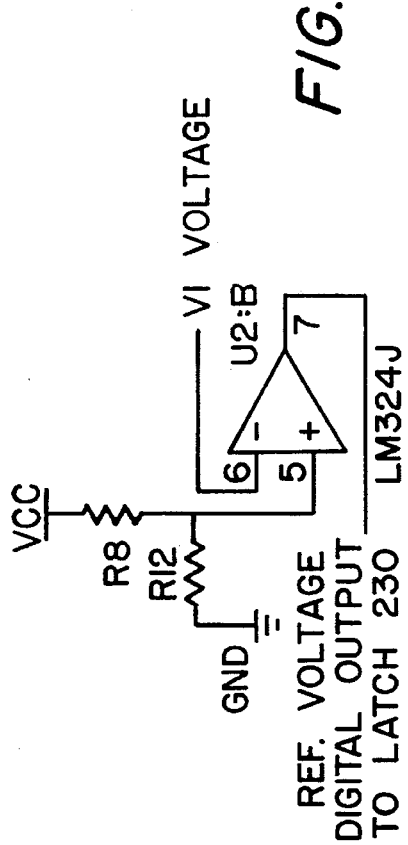
FIG. 7 is a schematic diagram illustrating the threshold detector portion of the circuit for determining if a detected signal exceed a predetermined minimum threshold alarm value.
Figure 6:
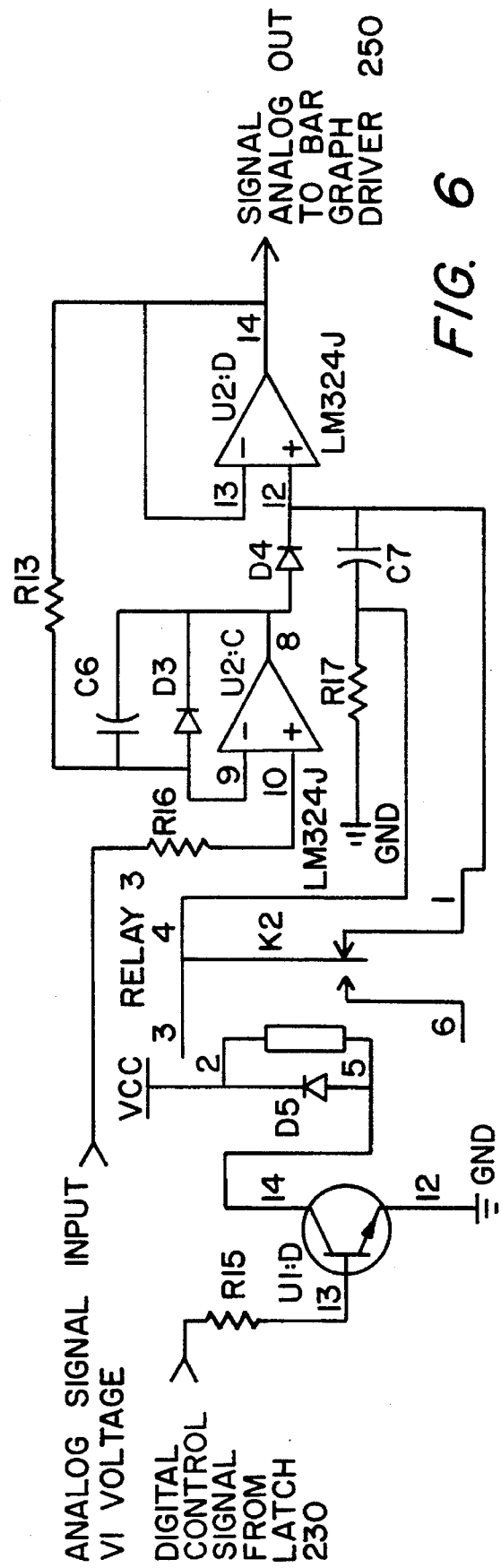
FIG. 6 is a schematic diagram illustrating the peak hold portion of the circuit for providing a display of peak detector signal strength.

With reference to FIGS. 1 and 3, an example cart 14 for holding a medical waste disposal bag will now be described in detail. The cart 14 includes four tubular lower leg members 50, 52, 54, and 56 pivotally connected together in pairs by pivotal connections 58 and 60 which may comprise rivets, pins, bolts, or screws. Upper, generally U-shaped, portions of the cart 14 include straight transverse cross bar portions 62 and 64 extending between respective side frame bars 66, 68 and 70, 72. Interengaging telescoping connections 74, 76, 78, and 80 removably connect the side frame bars 66, 68, 70, and 72 to the lower leg members 52, 50, 56, and 54, respectively. This detachable construction, in conjunction with the pivotal connections 58 and 60, allows the device to be collapsed for shipping and storage, yet readily assembled without the use of tools. Preferably, the upper U-shaped portions of the cart 14 comprising elements 62, 64, 66, 68, 70, and 72 are formed from a non-metallic material such as PVC plastic tubing in order to minimize interference with the metal detector circuitry. The lower components of the cart 14 may be formed from a lightweight tubular metal material such as aluminum tubing. A bag support rack 82 includes four corner portions pivotally connected at 83 to lower end portions of the leg members 50, 52, 54, and 56. In addition the rack 82 has a two-piece construction, with side rail members bifurcated at abutting joints 85. Accordingly, the two rack halves may be folded upwardly for storage or transportation of the cart 14. The leg members 50, 52, 54, and 56 terminate in respective castors 84, 90, 86, and 88 which allow the cart 14 to be easily rolled to a desired location for use. In use, a medical waste disposal bag is placed on rack 82, with upper side portions of the bag folded outwardly over the cross bars 62 and 64 to maintain the mouth of the bag in an open condition.

With reference now to FIG. 1, the manner of pivotal securement of the housing 12 to the cart 14 will now be described in detail. A hinge 16 in the form of an aluminum strut 93 has a first end pivotally secured by a fastener 92 to the peripheral skirt 20 of the housing 12. A second fastener 94 pivotally secures an opposite end of the strut 93 to an upper portion of the side frame member 66. Fasteners 92 and 94 may take the form of bolts, screws, rivets, or pins. An identical pivotal strut and fastener assembly similarly secures the opposite peripheral skirt portion of the housing 12 to the side frame member 68 (FIG. 3).

By virtue of this compound pivotal linkage, the entire housing 12 may thus be pivoted along arc C between open position A and closed position B, as shown in FIG. 1. In this context, it should be particularly noted that the housing 12 and cart 14 are preferably complementarily dimensioned such that the cross bars 62 and 64 of the cart nest within the peripheral skirt 20 of the housing 12 in the closed position B.

With reference to FIGS. 1 and 4–7, the electronic components of the metal detector 10 will now be described. A detector coil 200 physically mounted on the cylindrical flange 31 surrounds the aperture 30. An electrical cable 201 extends beneath the top surface of the housing 12 and through a grommet and into the control box 35 where the remainder of the detection circuitry is located. A rechargeable NI-Cad battery 202 provides all operating power for the detection circuitry. A jack 204 extends through the rear portion of the skirt 20 (FIG. 1) and allows connection of the battery 202 to a conventional recharging device in a conventional manner. A latching relay K1 controlled by "ON" push button 44 and "OFF" push button 46 provides for connection and disconnection of the battery 202 to the electronic detection circuitry. In the "ON" position, a voltage regulator VR1 reduces the battery voltage V+ to a reduced regulated voltage VCC.

The detection circuitry includes a primary coil L1 through which current initially flows. The conduction of transistor Q1 and resistor R2 and variable resistor R3 control current through the primary coil L1. The momentary current through the primary coil L1 induces a voltage in the detector coil L2, which controls the conduction of transistor Q1, which in turn again pulses current through the primary coil L1. The frequency of the oscillations is determined by the parallel resonant frequency of the primary coil L1 and capacitor C1. The detector coil L2 voltage also controls the conduction of transistor Q2, which generates a D.C. voltage V1 through resistors R4 and capacitor C3 which is directly proportional to the induced voltage in the detector coil L2. When a metal object enters the magnetic field of primary coil L1 and detector coil L2, eddy currents are produced in that object. These eddy currents affect the magnetic field and the induced voltage in the detector coil L2. This change is detected in the D.C. voltage V1.

The detector circuitry includes an auto calibration feature to prevent drift and maintain the accuracy of the detector over time, without allowing transient fluctuations to impair detector performance. An amplifier U1 compares the voltage V1 with a reference voltage set up by resistors R5 and R6. The amplifier output swings high or low and is integrated through resistor R9 and capacitor C5. The output then conducts through resistor R10 to transistor Q1, which influences the amount of current pulsed through the primary coil L1. The action of this network maintains the voltage V1 to match the reference voltage at the amplifier U1. Since fluctuations are integrated over time, the network does not react to transient changes, only to long term changes, and thus serves to stabilize the sensitivity of the metal detector.

The metal detector 10 includes an audible alarm 210 as well as the LCD bar graph visual display 36 to alert an operator of the passage of a significant metal object through the detector coil L2. A threshold detector 220 compares the voltage V1 induced in the detector coil L2 with a reference value. If V1 exceeds the threshold reference voltage, the threshold detector 220 sets a latch 230, which in turn activates the audio alarm 210. The external reset button 42 for the latch 230 shuts off the alarm. While the alarm 210 is activated, a peak hold circuit 240 processes the voltage V1 induced in the detector coil L2 and outputs the highest V1 voltage to the analog input of a bar graph driver 250. The bar graph driver 250 displays the peak voltage V1 on one portion 36 of a dual bar graph LCD display 270. A second bar graph driver 260 displays the battery voltage V+ on the other portion 38 of the LCD display 270 and also pulses the low battery LED 39 if the battery voltage V+ falls below a predetermined limit.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A metal detector, comprising:

a housing provided with an aperture adapted for the passage of articles therethrough, said housing having a substantially rectangular shape and including a downwardly depending peripheral skirt portion adapted to at least partially overlie a receptacle for receiving articles inserted through said aperture;

means in said housing for detecting the passage of metal articles through said aperture in said housing; and a hinge on said housing for mounting said housing to said receptacle for movement between an open position allowing access to the receptacle and a closed position for substantially blocking access to the receptacle, except through said aperture in said housing.

2. The metal detector of claim 1, wherein said housing comprises an upwardly inclined control console including a visual display for indicating the size of metal objects inserted through said aperture in said housing.

3. The metal detector of claim 1, wherein said aperture is disposed substantially centrally in said housing and further comprising a downwardly and inwardly inclined funnel-like surface of said housing surrounding said aperture.

4. The metal detector of claim 1, wherein said means for detecting the passage of metal articles includes a detector coil surrounding said aperture in said housing and further comprising means for auto calibration of said detector coil operative to compare an output voltage of said detector coil with a reference voltage and integrate the results of said comparison over time to stabilize the sensitivity of the metal detector, while substantially ignoring transient voltage fluctuations.

5. The metal detector of claim 1, wherein said hinge comprises a pair of struts each having a first end pivotally connected to a side portion of said housing and a second end adapted for pivotal securement to a receptacle, mounting said housing for compound pivotal movement between said open and closed positions.

6. In combination with receptacle adapted for receiving articles, a metal detector comprising:

a housing provided with an aperture adapted for the passage of articles therethrough, said housing having a substantially rectangular shape and including a downwardly depending peripheral skirt portion adapted to at least partially overlie said receptacle for receiving articles inserted through said aperture;

means in said housing for detecting the passage of the metal articles through said aperture in said housing; and a hinge on said housing for mounting said housing to said to said receptacle for movement between an open position allowing access to the receptacle and a closed position for substantially blocking access to the receptacle, except through said aperture in said housing.

7. The metal detector of claim 6, wherein said housing comprises an upwardly inclined control console including a visual display for indicating the size of metal objects inserted through said aperture in said housing.

8. The metal detector of claim 6, wherein said aperture is disposed substantially centrally in said housing and further comprising a downwardly and inwardly inclined funnel-like surface of said housing surrounding said aperture.

9. The metal detector of claim 6, wherein said means for detecting the passage of metal articles includes a detector coil surrounding said aperture in said housing and further comprising means for auto calibration of said detector coil operative to compare an output voltage of said detector coil with a reference voltage and integrate the results of said comparison over time to stabilize the sensitivity of the metal detector, while substantially ignoring transient voltage fluctuations.

10. The metal detector of claim 6, wherein said hinge comprises a pair of struts each having a first end pivotally connected to a side portion of said housing and a second end adapted for pivotal securement to a receptacle, mounting said housing for compound pivotal movement between said open and closed position.

11. A metal detector, comprising;

a housing provided with an aperture adapted for the passage of articles therethrough, said aperture disposed substantially centrally in said housing and further comprising a downwardly and inwardly and inclined funnel-like surface of said housing surrounding said aperture, said housing having a substantially rectangular shape and including a downwardly depending peripheral skirt portion adapted to at least partially overlie a receptacle for receiving inserted through said aperture;

said housing including an upwardly inclined control console including a visual display for indicating the size of metal objects inserted through said aperture in said housing;

means in said housing for detecting the passage of metal articles through said aperture in said housing: and a hinge on said housing for mounting said housing to said receptacle for movement between an open position allowing access to the receptacle and a closed position for substantially blocking access to the receptacle, except through said aperture in said housing.

12. The metal detector of claim 11, wherein said means for detecting the passage of metal articles includes a detector coil surrounding said aperture in said housing and further comprising means for auto calibration of said detector coil operative to compare an output voltage of said detector coil with a reference voltage and integrate the results of said comparison over time to stabilize the sensitivity of the metal detector, while substantially ignoring transient voltage fluctuations.

13. The metal detector of claim 11, wherein said hinge comprises a pair of struts each having a first end pivotally connected to a side portion of said housing and a second end adapted for pivotal securement to a receptacle, mounting said housing for compound pivotal movement between said open and closed positions.

14. In combination with the metal detector of claim 13, a receptacle including a tubular frame construction having at least two spaced legs; and one of said struts pivotally 2mounted on each of said legs.

* * * * *